US007823442B2

(12) United States Patent
O'Neill

(10) Patent No.: US 7,823,442 B2
(45) Date of Patent: Nov. 2, 2010

(54) THROTTLE POSITION SENSOR ASSEMBLY

(75) Inventor: Dan O'Neill, Chatham (CA)

(73) Assignee: KSR Technologies Co., Ridgetown (CA)

( * ) Notice: Subject to any disclaimer, the term of this patent is extended or adjusted under 35 U.S.C. 154(b) by 315 days.

(21) Appl. No.: 12/099,987

(22) Filed: Apr. 9, 2008

(65) Prior Publication Data

US 2008/0245143 A1 Oct. 9, 2008

Related U.S. Application Data

(60) Provisional application No. 60/910,726, filed on Apr. 9, 2007.

(51) Int. Cl.
*G01M 15/04* (2006.01)

(52) U.S. Cl. .................................................... 73/114.36

(58) Field of Classification Search .............. 73/114.31, 73/114.32, 114.36, 114.37, 114.77
See application file for complete search history.

(56) References Cited

U.S. PATENT DOCUMENTS 4,616,504 A * 10/1986 Overcash et al. ......... 73/114.36
4,893,502 A * 1/1990 Kubota et al. ............ 73/114.36
4,989,451 A * 2/1991 Ogawa et al. ............ 73/114.36
5,756,890 A 5/1998 Fedison, Jr.
6,018,992 A 2/2000 Kaijala
6,026,782 A 2/2000 Daly et al.
6,029,510 A * 2/2000 Nakaie et al. ............ 73/114.36
6,499,461 B2 * 12/2002 Kubota et al. ............... 123/361
6,874,470 B2 * 4/2005 Hedrick et al. .............. 123/396
2001/0013331 A1 * 8/2001 Kamimura et al. .......... 123/337
2003/0110847 A1 * 6/2003 Kubo et al. ................ 73/118.1
2004/0135574 A1 7/2004 Hagio et al.
2004/0173182 A1 * 9/2004 Hedrick et al. .............. 123/396

FOREIGN PATENT DOCUMENTS

EP 1 063 495 12/2000

* cited by examiner

*Primary Examiner*—Eric S McCall
(74) *Attorney, Agent, or Firm*—Gifford, Krass, Sprinkle, Anderson & Citkowski, P.C.

(57) ABSTRACT

A throttle position sensor having a housing and a body rotatably mounted within the housing. An alignment clip is attached to the body so that the alignment clip rotates in unison with the body. This alignment clip, furthermore, is adapted to receive an end of a throttle shaft at a predetermined angular position and aligned body to the throttle shaft. A sensor is also mounted to the housing and generates an output signal representative of the rotational position of the body relative to the housing.

11 Claims, 3 Drawing Sheets

THROTTLE POSITION SENSOR ASSEMBLY

CROSS REFERENCE TO RELATED APPLICATIONS

This application claims priority of U.S. Provisional Patent Application Ser. No. 60/910,726 filed Apr. 9, 2007, which is incorporated herein by reference.

BACKGROUND OF THE INVENTION

I. Field of the Invention

The present invention relates generally to a throttle position sensor of the type used in automotive vehicles.

II. Description of Related Art

Most modern automotive vehicles include a throttle position sensor assembly which detects the rotational position of the throttle plate and generates an output signal representative of that position. The electrical signal is electrically connected as an input signal to an engine management unit, typically microprocessor based, which controls the overall operation of the internal combustion engine for the automotive vehicle.

Typically, the previously known throttle position sensor assemblies include a rotatable body which attaches to the throttle plate shaft so that the body and the throttle plate shaft rotate in unison with each other. In some cases, the rotatable body in the sensor assembly includes a cavity having a noncircular cross-sectional shape, typically square, and which is the same noncircular cross-sectional shape as the throttle plate shaft. Consequently, with the end of the shaft positioned within the body cavity, the rotational angle of the body relative to the throttle shaft is fixed. Likewise, the throttle shaft and body thereafter rotate in unison with each other.

A primary disadvantage of these previously known throttle position sensor assemblies, however, is that it is somewhat time consuming to properly align the throttle plate shaft with the cavity in the rotatable body when attaching the throttle position sensor to the main throttle body. Furthermore, the end of the throttle shaft cannot slide into the cavity until the throttle plate shaft and body cavity were precisely aligned with each other.

The necessity to precisely align the throttle plate shaft with the body cavity resulted in increased assembly time for the overall throttle assembly including the sensor. This increased time thus increased the overall manufacturing cost for the automotive vehicle.

SUMMARY OF THE PRESENT INVENTION

The present invention provides a throttle position sensor assembly which overcomes the above-mentioned disadvantages of the previously known throttle position sensor assemblies.

In brief, the present invention comprises a housing having a cylindrical cavity closed at one end by a plate. A cylindrical body is then rotatably mounted within the housing cavity.

An alignment clip is attached to the body so that the alignment clip is aligned with the body axis and rotates in unison with the body. This alignment clip, furthermore, is dimensioned to receive an end of a throttle plate shaft so that, upon receipt, the throttle plate shaft and body are automatically aligned to a preset rotational position relative to each other.

A sensor is mounted to the housing in alignment with the axis of the cylindrical body. This sensor generates an output signal representative of the rotational position of the body relative to the housing. Consequently, the output from the sensor is representative of the angular position of the throttle plate shaft.

Preferably, the alignment clip comprises a spring metal clip having two opposing side portions which form a narrow slot therebetween. This narrow slot is dimensioned to receive a flattened end of the throttle plate shaft. Furthermore, since the alignment clip may deflect somewhat upon the insertion of the throttle plate shaft, the alignment clip will tolerate misalignment of the throttle plate shaft with the body during the assembly process. This, in turn, facilitates and speeds up the assembly process for the overall throttle and throttle sensor assembly.

BRIEF DESCRIPTION OF THE DRAWING

A better understanding of the present invention will be had upon reference to the following detailed description when read in conjunction with the accompanying drawing, wherein like reference characters refer to lice parts throughout the several views, and in which.

DETAILED DESCRIPTION OF A PREFERRED EMBODIMENT OF THE PRESENT INVENTION

Figures 1, 4:
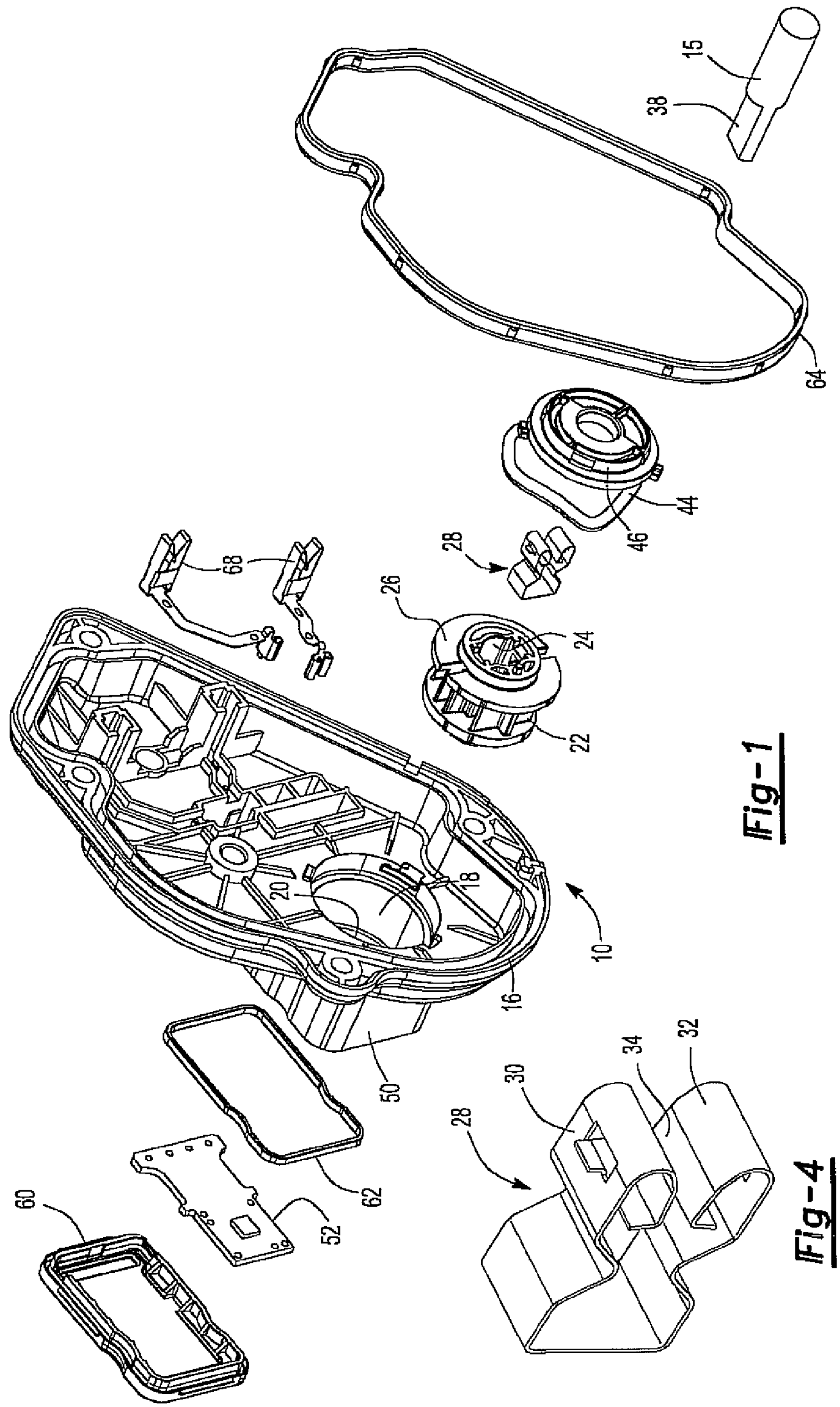
FIG. 1 is an exploded bottom perspective view showing a preferred embodiment of the invention.
FIG. 4 is a perspective view illustrating one component of the present invention.
Figure 2:
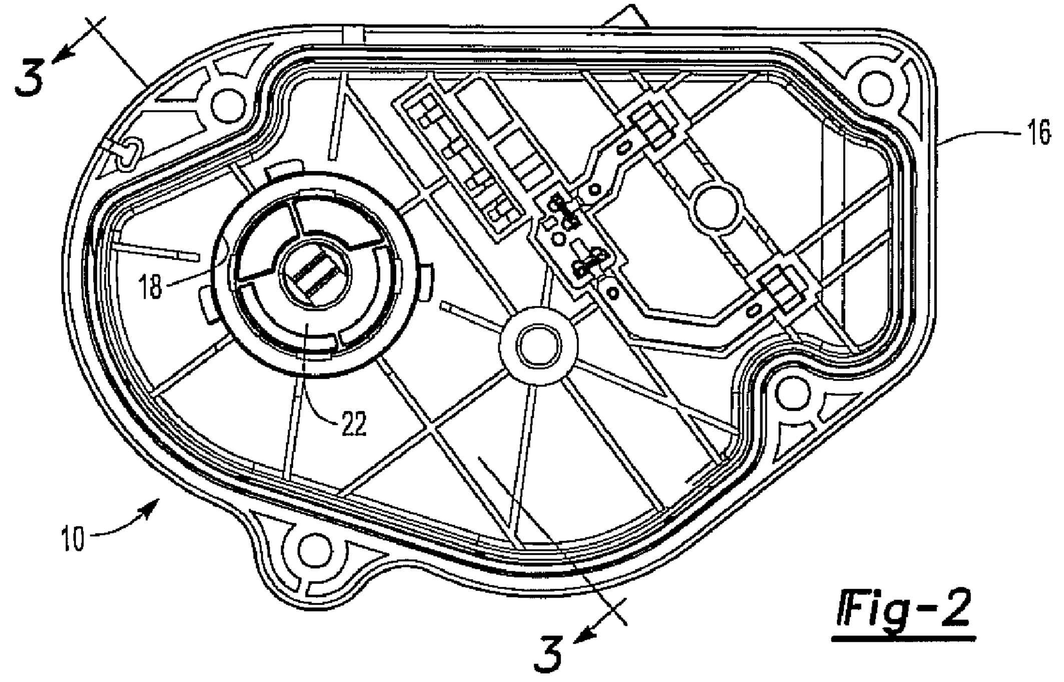
FIG. 2 is a bottom view thereof.
Figure 3:
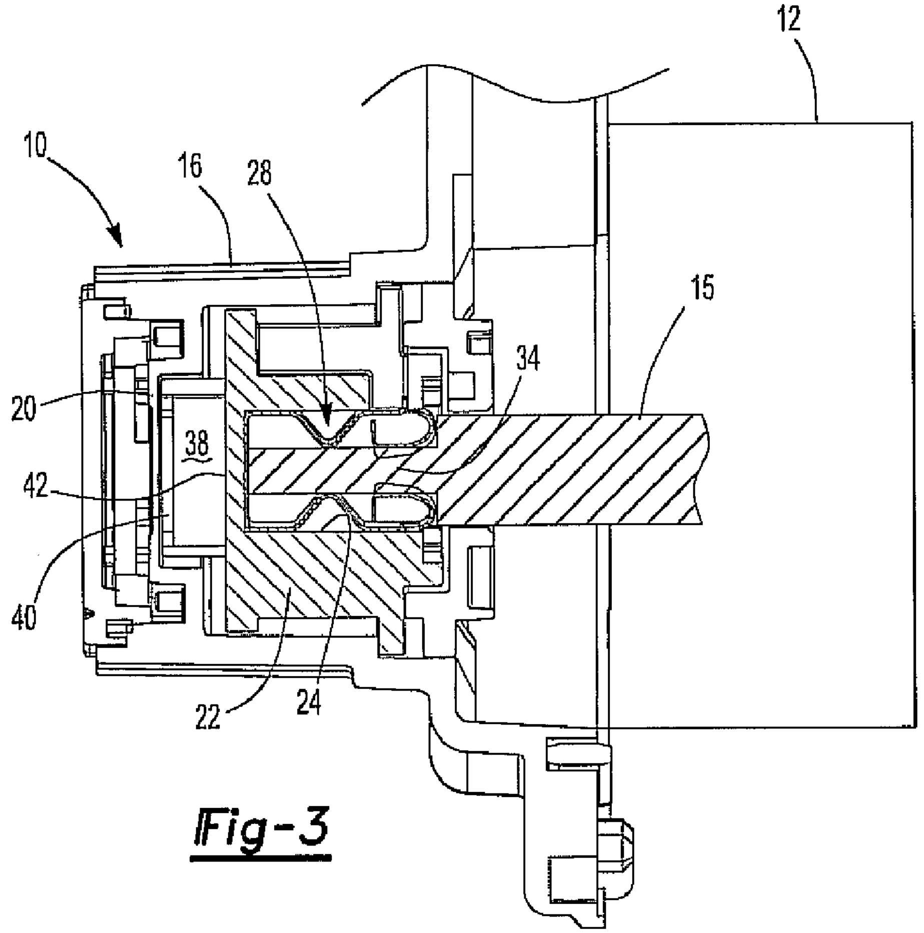
FIG. 3 is a fragmentary side sectional view thereof.

With reference first to FIGS. 1-3, a preferred embodiment of a throttle position sensor assembly 10 according to the present invention is shown mounted to a throttle main body 12 (FIG. 3). The throttle position sensor 10 generates an electrical output signal on its output terminal 17 (FIG. 5) representative of the position of the throttle plate.

The throttle position sensor assembly 10 includes a housing 16 preferably made of a plastic material. A cylindrical cavity 18 (FIG. 1) is formed within the housing 16 so that the axis of the cavity 18 is aligned with the axis of a throttle plate shaft 15 (FIG. 3) extending outwardly from the throttle main body 12. Furthermore, the inner end of the cylindrical cavity 18 is closed by a plate 20 which is preferably of a one-piece construction with the housing 16.

A cylindrical body 22 having a diameter the same or slightly less than the diameter of the cavity 18 is rotatably disposed within the cavity 18. Consequently, the body 22 is coaxial with the throttle shaft 15.

A noncircular and preferably rectangular recess 24 is formed in the axial end of the body 22 facing the throttle shaft 15. An alignment clip 28 having a cross-sectional shape complementary to the shape of the recess 24 is then positioned within the recess 24 so that the alignment clip 28 rotates in unison with the body 22.

As best shown in FIGS. 1-4, the alignment clip 28 is constructed of a resilient material, preferably spring steel, that includes two side portions 30 and 32 which, together, form an elongated slot 34 therebetween. Any conventional means may be used to secure the alignment clip 28 to the body 22.

Figure 6A:
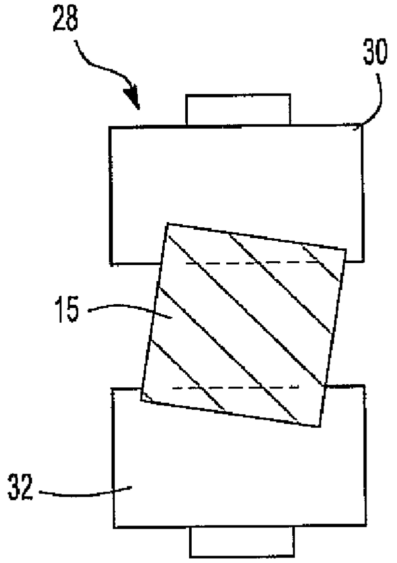
FIGS. 6A and 6B are diagrammatic axial views illustrating the operation of the present invention.
Figure 6B:
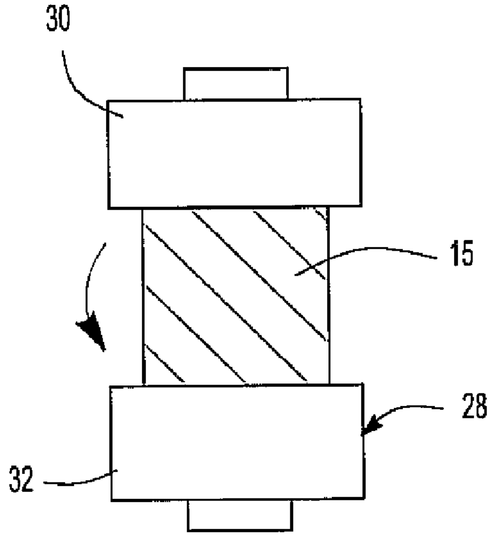

The alignment clip 28 is dimensioned to receive a flattened end 38 of the throttle shaft 15 in the slot 34 formed between the side portions 30 and 32 of the alignment clip 28. Consequently, upon insertion of the flattened portion 38 of the throttle shaft 15 through the slot 34, the alignment clip side portions 30 and 32 will deflect outwardly to accommodate the throttle shaft flattened portion 38 and automatically alien the alignment clip 28, and thus the body 22, with the throttle shaft 15. Furthermore, this automatic alignment of the alignment clip 28 with the throttle shaft 15 occurs despite misalignment of the shaft 15 and alignment clip 28 during assembly of the sensor onto the throttle main body 12. For example, as best shown in FIG. 6A, the shaft 15 is slightly misaligned relative to the clip 28. However, as the shaft 15 is inserted into the clip as shown in FIG. 6B, the clip 28 automatically aligns the shaft 15 and clip 28 together. Instead, any such misalignment would merely cause the side portions 30 and 32 of the alignment clip 28 to deflect and automatically rotate the alignment clip 28 with the attached cylindrical body 22 until the outer edge portions of the alignment clip side portions 30 and 32 flatly abut against the shaft portion 38.

Consequently, it can be seen that the alignment clip 28 automatically aligns the body 22 with the throttle plate shaft 15 upon connection of the throttle position sensor assembly 10 to the throttle assembly 12.

Referring again to FIG. 3, in order to provide an output signal from the sensor assembly 10 representative of the position of the throttle plate shaft 15, a rotor 40 is mounted to the axial end 42 of the body 22 facing away from the throttle plate shaft 15. Any conventional means, such as screws, may be used to secure the rotor 40 to the body 22.

The rotor 40 flatly abuts against an inner side of the plate 20. In order to maintain this flat abutment between the rotor 40 and the plate 20, a wave spring 44 is preferably compressed in between a retainer 46 and the end 26 of the body 22. The retainer 46 is secured to the housing 16 so that the wave spring 44 urges the body 22 axially towards the plate 20.

Figure 5:
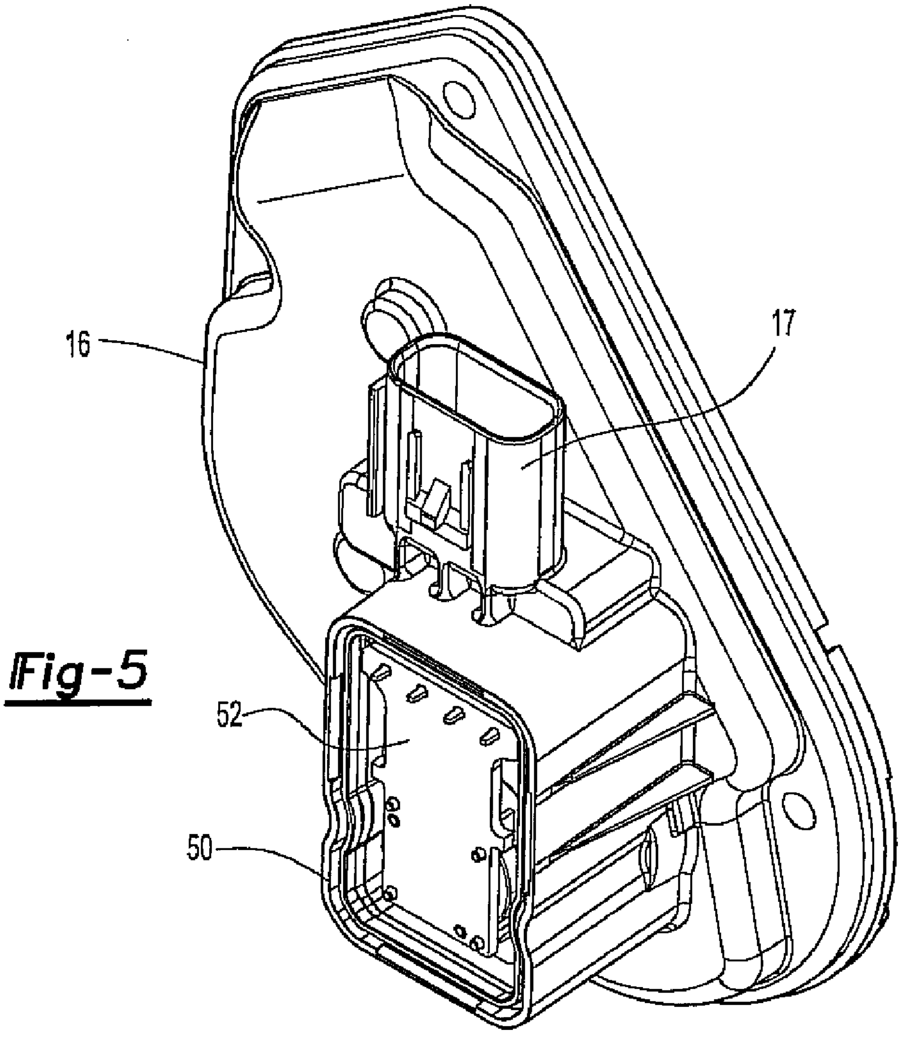
FIG. 5 is a perspective top view of the preferred embodiment of the invention.

As best shown in FIG. 5, the housing 16 includes a compartment 50 which surrounds the cavity 18 formed in the housing. This compartment 50 is preferably of a one-piece plastic construction with the housing 16.

An inductive sensor 52 is positioned within the compartment so that a portion of the sensor 52 is aligned with the plate 20 and thus aligned with the rotor 40 mounted to the body 22. During rotation of the body 22, as would be caused by rotation of the throttle plate shaft 15, the magnetic coaction between the rotor 40 and the sensor 52 provides an electrical output signal which varies and is representative of the rotational position of the throttle plate shaft 15. This output signal from terminal 17 is typically electrically connected to an engine management unit.

In order to protect the sensor 52 from contaminants, a cover 60 is preferably disposed over and sealingly connected to the compartment 50 by a seal 62. In doing so, the sensor 52 is completely isolated from contaminants and external elements.

Similarly, a seal 64 (FIG. 1) is preferably disposed between the housing 16 and the throttle assembly 12. This seal 64 thus protects the rotatable body 22 and its associated components from contaminants and other debris.

With reference now particularly to FIG. 1, many modern day throttles are electrically controlled. As such, one or more electric terminals 68 are mounted to the sensor housing 16. These terminals 68 are electrically accessible externally of the housing 16 and provide an electrical connection point to the servo motor or other mechanism used to electrically actuate the throttle plate shaft 15.

From the foregoing, it can be seen that the present invention provides a simple and yet highly effectively throttle position sensor assembly which facilitates the rapid and automatic alignment of the rotatable sensor element or body and the throttle plate shaft even despite initial misalignment. This reduction in assembly time of the throttle position sensor assembly to the throttle assembly thus provides appreciable cost savings for the assembly of the automotive vehicle.

Having described my invention, however, many modifications thereto will become apparent to those skilled in the art to which it pertains without deviation from the spirit of the invention as defined by the scope of the appended claims.

I claim:

1. A throttle position sensor assembly comprising:

a housing, a body rotatably mounted in said housing, an alignment clip attached to said body so that said alignment clip rotates in unison with said body, said alignment clip dimensioned to receive an end of a throttle plate shaft and align said body to said throttle plate shaft, a sensor mounted to said housing, said sensor generating an output signal representative of the rotational position of said body relative to said housing, wherein said end of said throttle plate shaft includes two flattened portions which lie in spaced apart and parallel planes, and wherein said alignment clip is constructed of spring steel and a base and two spaced apart and parallel sides. said sides of said clip forming a slot therebetween, said slot having a width less than the spacing of said flattened portions of said throttle plate shaft so that, upon insertion of said end of said throttle plate shaft into said alignment clip slot, said sides of said alignment clip engage said flattened portions of said throttle plate shaft to automatically resiliently align said throttle plate shaft to said clip, and wherein said body has a noncircular recess complementary in shape to the base of said alignment clip, said alignment clip being disposed in said recess to thereby automatically align said clip to said body.

2. The throttle position sensor assembly as defined in claim 1 wherein said sensor comprises an inductive sensor.

3. The throttle position sensor assembly as defined in claim 1 wherein said housing includes a compartment aligned with but separated from said body, said sensor being disposed in said compartment.

4. The throttle position sensor assembly as defined in claim 3 and comprising a cover which overlies and closes said compartment.

5. The throttle position sensor assembly as defined in claim 1 wherein said alignment clip is of a one-piece construction.

6. The throttle position sensor assembly as defined in claim 1 and comprising a spring which axially urges said body towards said sensor.

7. The throttle position sensor assembly as defined in claim 1 and comprising a rotor attached to an end of said body,

8. The throttle position sensor assembly as defined in claim 1 wherein said body is cylindrical in shape and wherein said housing includes a cylindrical cavity complementary in shape and size to said body, a plate extending over and closing one end of said cavity, said body being rotatably disposed in said cavity so that one axial end of said body is positioned adjacent one side of said plate.

9. The throttle position sensor assembly as defined in claim 8 wherein said sensor is mounted on the other side of said plate.

10. The throttle position sensor assembly as defined in claim 9 wherein said plate and said housing are of a one-piece construction.

11. The throttle position sensor assembly as defined in claim 9 wherein said plate and said housing are of a one-piece plastic construction.

* * * * *